United States Patent
Foti et al.

(10) Patent No.: US 7,625,127 B2
(45) Date of Patent: Dec. 1, 2009

(54) SEALING DEVICE FOR BEARINGS HAVING CHANNELS FOR SUPPLYING PRESSURIZED AIR TO THE TIRE OF A VEHICLE WHEEL

(75) Inventors: Claudio Foti, Dusino San Michele (IT); Andrea Serafini, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 362 days.

(21) Appl. No.: 11/600,410

(22) Filed: Nov. 15, 2006

(65) Prior Publication Data

US 2007/0133916 A1    Jun. 14, 2007

(30) Foreign Application Priority Data

Nov. 17, 2005    (EP) .................................. 05110859

(51) Int. Cl.
*F16C 33/76*    (2006.01)
(52) U.S. Cl. ................. 384/484; 384/477; 384/544; 152/417
(58) Field of Classification Search ............. 384/484, 384/486, 544, 589, 477; 277/551, 552, 561, 277/563, 564, 572; 152/416, 418
See application file for complete search history.

(56) References Cited

U.S. PATENT DOCUMENTS

| | | | | |
|---|---|---|---|---|
| 5,348,402 | A | * | 9/1994 | Porter .......................... 384/462 |
| 5,484,213 | A | | 1/1996 | Caillaut et al. |
| 5,503,480 | A | * | 4/1996 | Caillaut et al. ............... 384/477 |
| 5,642,946 | A | * | 7/1997 | Caillault et al. ............. 384/486 |
| 6,409,177 | B1 | * | 6/2002 | Johnston ...................... 277/551 |
| 6,428,212 | B1 | * | 8/2002 | Tanaka ......................... 384/475 |
| 6,896,413 | B2 | * | 5/2005 | Zavaglia et al. ............. 384/484 |
| 7,086,784 | B2 | * | 8/2006 | Ruetter et al. ............... 384/544 |

FOREIGN PATENT DOCUMENTS

| | | |
|---|---|---|
| EP | 0 362 921 A2 | 4/1990 |
| EP | 0 410 723 A1 | 1/1991 |
| EP | 1 147 925 A2 | 10/2001 |

* cited by examiner

*Primary Examiner*—Phillip Johnson
(74) *Attorney, Agent, or Firm*—Merchant & Gould P.C.

(57) ABSTRACT

A sealing device for a bearing of the hub of a motor vehicle wheel comprising a stationary race (1) and a rotatable race (2), each defining respective channels (6, 7) for the passage of pressurized air. The sealing device (20) is to be mounted between the rotatable race and the stationary race in order to delimit laterally and hermetically seal an annular space or chamber (14) defined between the bearing races (1, 2) and communicating with the channels (6, 7). The sealing device (20) comprises two sealing units (9) axially facing one another. Each sealing unit (9) comprises an annular reinforcement (10) having an axial cylindrical wall (10*a*) for mounting to a first bearing race (1) and a radial wall (10*b*) for reinforcing a flexible gasket (11). The two sealing units (9) are coupled by means of an annular element (21) having a plurality of radial air passages (22). The annular element (21) is located coaxially and forcefully coupled with radial interference with the cylindrical walls (10*a*) of the two reinforcements (10). The cylindrical walls (10*a*) of the two reinforcements are axially spaced from one another for allowing pressurized air to flow through the passages (22) of the annular element (21).

14 Claims, 3 Drawing Sheets

SEALING DEVICE FOR BEARINGS HAVING CHANNELS FOR SUPPLYING PRESSURIZED AIR TO THE TIRE OF A VEHICLE WHEEL

BACKGROUND OF THE INVENTION

The present invention refers to a sealing device.

There are known bearings for a vehicle wheel hub provided with special vents and sealing devices for inflating into the tire air pressurized by means of a source of pressurized air mounted on board of the vehicle. These solutions allow to adjust and/or monitor the air pressure in the tires.

FIG. 1 of the accompanying drawings shows a bearing of the aforementioned type, known, for example, from U.S. Pat. No. 5,484,213. The bearing of FIG. 1 comprises an outer race 1, an inner race 2 formed by two axially adjacent half-races, and two sets of bearing balls 3. In a radial plane located between the two sets of balls 3 there are several outer radial channels 6 passing through the bearing outer race 1, and several inner radial channels 7 formed through the bearing inner race 2.

Mounted in the annular space defined by the outer race 1, the inner race 2 and the two sets of balls 3 are two annular sealing units 9 that allow pressurized air to pass through the outer 6 and inner 7 channels of the bearing. The two sealing units are facing one another axially and disposed symmetrically with respect to the radial plane in which the channels 6 and 7 of the bearing unit lie. Each sealing unit 9 comprises a metal reinforcement 10 on which a flexible gasket 11 is over-molded. The reinforcement 10 is formed by a sheet metal bent so as to have an axial cylindrical wall that is axially fixed to the outer race 1 of the bearing and a radial wall for stiffening the gasket 11. This gasket forms an airtight sealing lip 12 that slidingly contacts a contact surface 13 of the inner race 2 of the bearing. The two sealing units 9 so arranged delimit an intermediate annular chamber 14. Air pressurized by a pressurized air source mounted on board of the vehicle, which may be part of an automatic system or a system controlled by the driver, passes through special ducts obtained in the suspension standard of the wheel where the bearing is housed, passes through the outer channels 6, in the intermediate annular chamber 14, through the inner channels 7, and from here is conveyed through other ducts to the wheel rim and finally the tire.

SUMMARY OF THE INVENTION

An object of the present invention is to provide a sealing device capable of being mounted in a bearing through a single assembling step.

Another object of the invention is to position the sealing device within a bearing accurately, either with respect to the air channels formed through the bearing races, as well as with respect to the adjacent rolling elements. It is desired, particularly, to ensure that the sealing device is steadily fixed within the bearing, in order to maintain with time the correct axial position, opposing destabilizing axial bursts of pressurized air passing through the bearing.

These and other objects and advantages, that will be better understood in the following, are accomplished according to the invention by a sealing device and a bearing assembly having the features defined in the appended claims.

BRIEF DESCRIPTION OF THE DRAWINGS

There will now be described a preferred but not limiting embodiment of the invention. Reference is made to the accompanying drawings, in which.

DETAILED DESCRIPTION OF THE PREFERRED EMBODIMENT(S)

Figure 1:
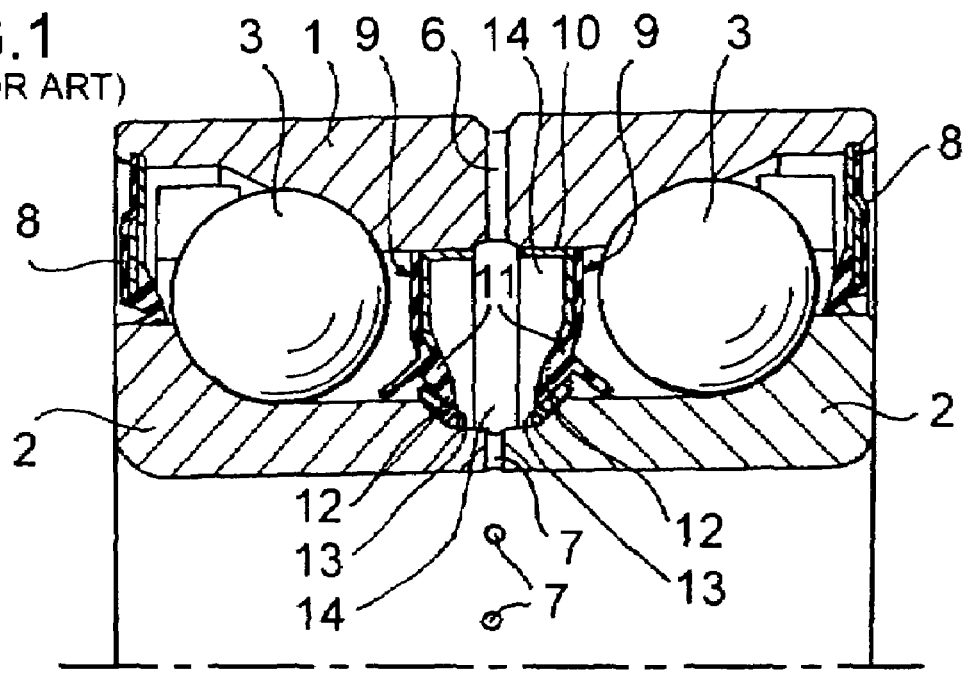
FIG. 1 is a partial, axial cross-sectional view of a bearing equipped with a sealing device of known kind.
Figure 2:
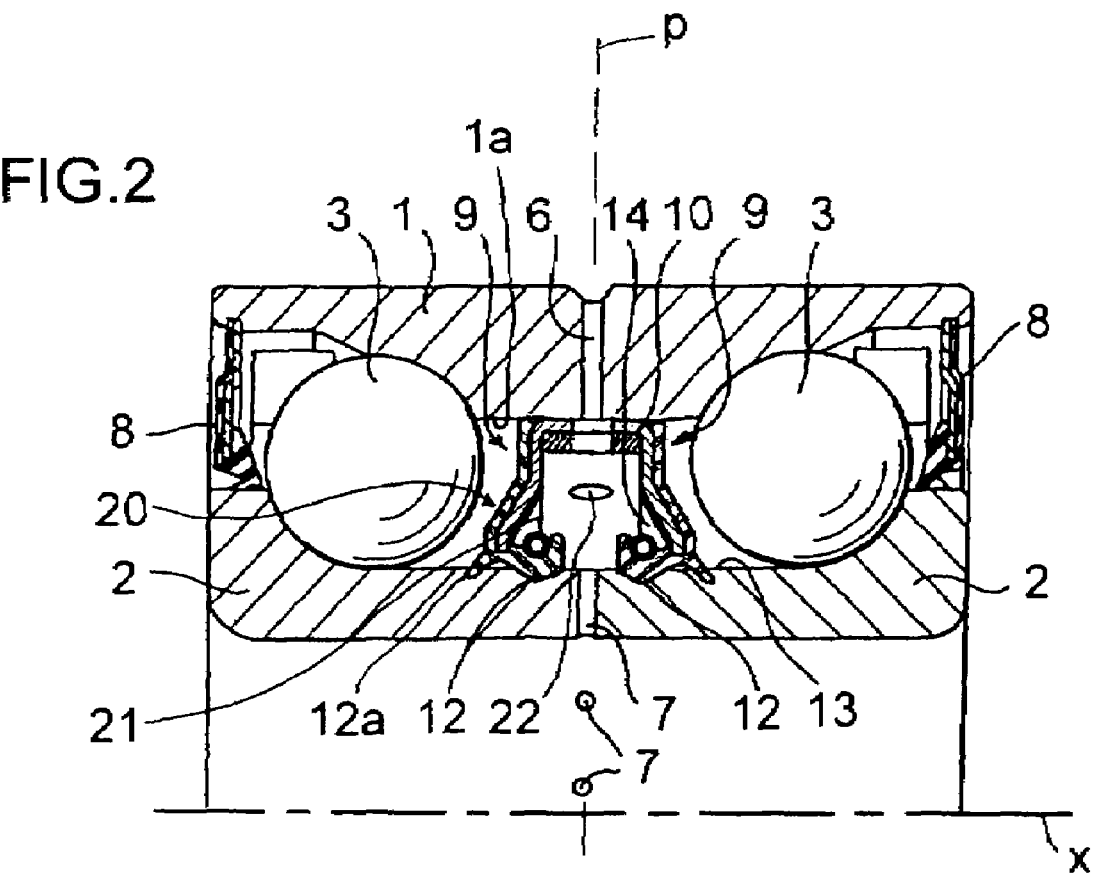
FIG. 2 is a partial, axial cross-sectional view of a bearing equipped with a sealing device according to the invention.

Referring to FIG. 2, a bearing unit for the hub of a motor vehicle wheel comprises a stationary outer race 1, a pair of rotatable, axially adjacent inner races 2, 2, and two sets of rolling elements 3, 3, in this example balls, radially interposed between the outer race 1 and the inner races 2, 2. The bearing is intended for mounting on a motor vehicle equipped with an on-board system for supplying pressurized air to the tires through the hubs of the wheels.

In order to establish air communication between the suspension standard (not shown), in which the outer race 1 is to be fitted, and the rotating hub (not shown) on which the inner races 2, 2 are to be mounted, the bearing forms one or more outer radial channels 6 for the passage of pressurized air through the outer race 1 and one or more inner radial channels 7 for the passage of pressurized air through the inner races 2, 2. Two conventional sealing devices indicated 8 are mounted at the axially opposite ends of the bearing, for hermetically sealing the annular gap between the bearing races.

Figures 3, 4:
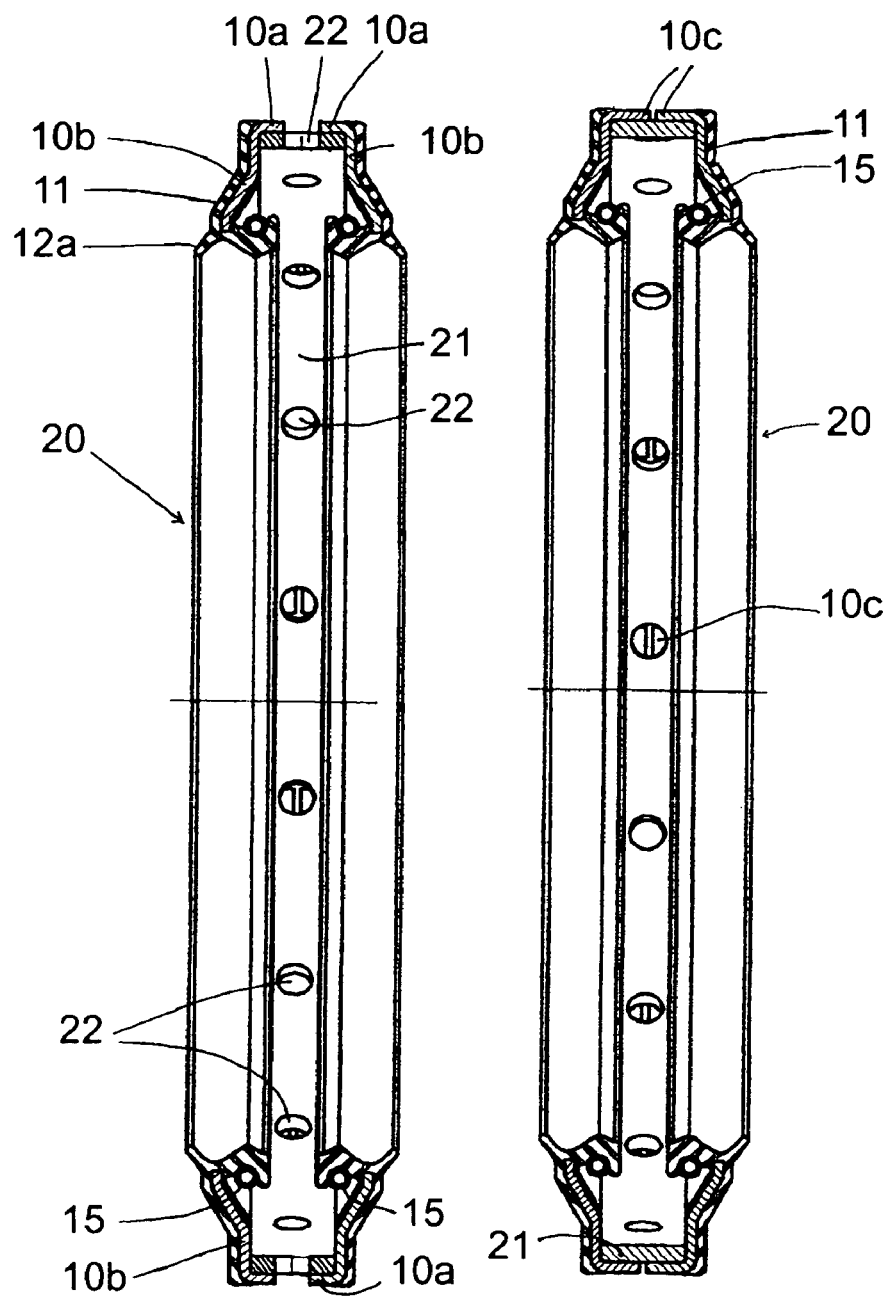
FIGS. 3 and 4 are axial cross-sectional views of the sealing device of FIG. 2, as seen in two angularly offset sectional planes.

In the annular space between the outer race 1, the inner races 2, 2 and the two sets of balls 3, 3 there is mounted a sealing device indicated overall at 20 and shown separately in FIGS. 3 and 4. The sealing device 20 serves to delimit laterally and hermetically seal an annular space or chamber 14 between the bearing races, in order to convey pressurized air from the inlet channels (6 or 7) through the chamber 14 towards the outlet channels (7 or 6), according to the direction of the air flow.

The sealing device 20 comprises a pair of annular sealing units 9 securely coupled by means of a perforated ring 21. The sealing units 9, which are advantageously identical, are facing one another axially and symmetrically with respect to a radial plane P that, in the assembled condition (FIG. 2), passes through the channels 6 and 7 of the bearing.

Each sealing unit 9 comprises an annular metal reinforcement 10 on which a gasket 11 of flexible material, such as an elastomeric material, is over-molded. The metal reinforcement is formed by a sheet metal bent to a substantially L-shape so as to provide a radially outer wall 10a of axial cylindrical shape that is forcefully fitted in the cylindrical cavity 1a of the bearing outer race 1, and a radial wall 10b for stiffening the gasket 11. This gasket extends in a radially inward direction to form a main airtight sealing lip 12 that slides on a contact surface 13 formed by one of the respective inner bearing races 2, 2.

As used in this context, terms and expressions such as "axially inner" and "axially outer" are to be construed with respect to the mid-plane P. Likewise, "radially inner" and "radially outer" should be construed with respect to the axis of rotation x of the bearing.

Figure 6:
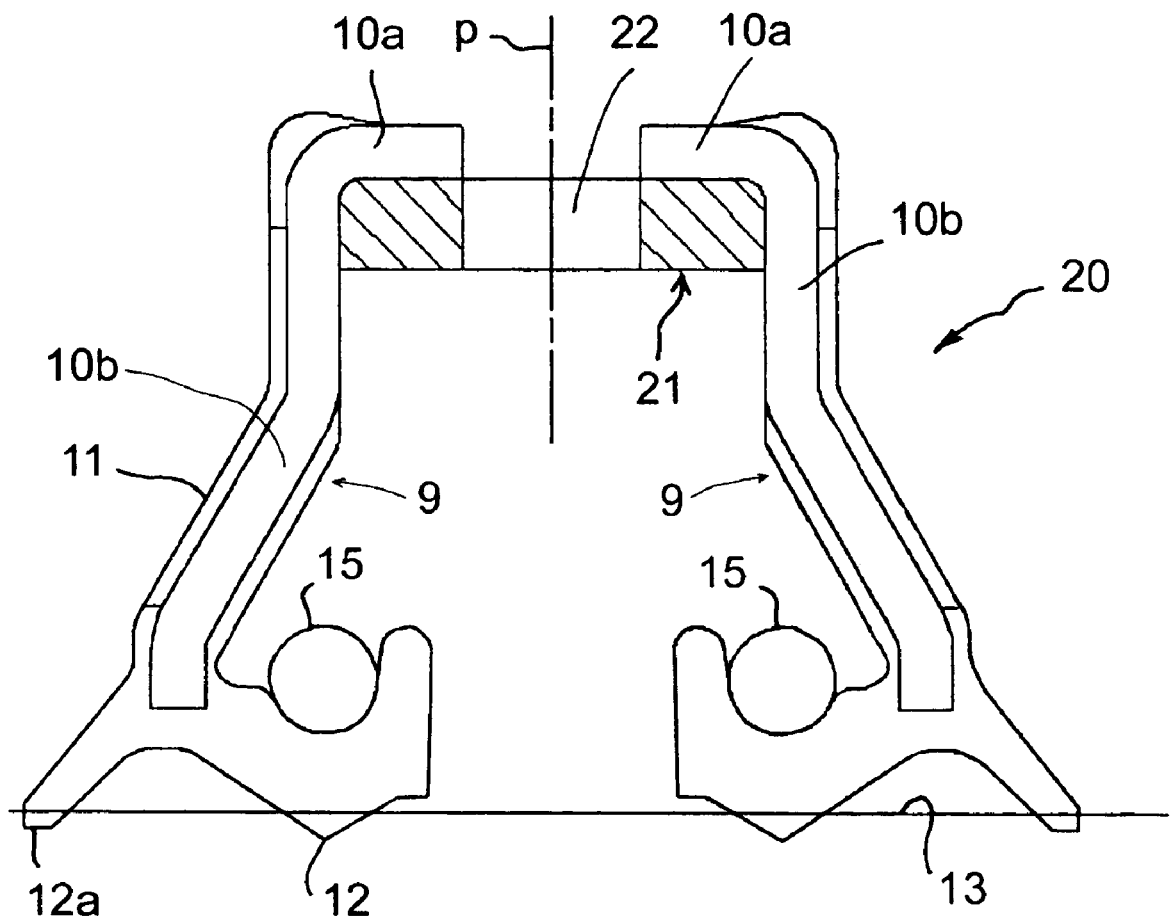
FIG. 6 is an enlarged view of a detail of FIG. 3.

Preferably, a circumferential spring 15 is fitted to the gasket 11 for radially urging the lip 12 against the counterface surface 13. The gasket 11 forms a further dust retainer lip 12a axially outer with respect to the main lip 12. In FIGS. 2 and 6, lips 12 and 12a of gasket 11 are shown in their non-deformed condition.

Referring to FIGS. 3 and 4, the perforated ring 21 has a plurality of radial bores 22 for the passage of air lying in the radial mid-plane P. The bores 22 are circumferentially spaced from one another so as to be radially aligned with the channels 6 in the outer bearing race in which the device 20 is to be fitted.

The ring 21 is forcefully fitted, with radial interference, between the outer cylindrical walls 10a of the reinforcements, so as to remain coaxially on the inside of them. It will be observed that the cylindrical walls of the two opposite sealing units are at least partially axially spaced from one another in order to let pressurized air flow through the bores 22 of ring 21.

A compact, preassembled unit is so attained, which can be transferred and handled as a single piece and fitted into the cylindrical cavity 1a of the bearing through a single assembling step. It will be noted that, advantageously, the flexible gaskets of the two sealing units can be simultaneously overmolded onto the respective reinforcements 10, already previously coupled with the perforated ring 21, in a single molding step.

The perforated ring 21 cooperates with the cylindrical walls 10a of the reinforcements in increasing the overall radial strength of the sealing device 20, so that this can be forcefully fitted into the cavity 1a with a considerably high radial interference. Such a forced fitting allows the device to maintain with time the correct axial position imparted upon assembling it into the bearing, efficiently opposing destabilizing axial thrusts caused by bursts of pressurized air in the chamber 14 and tending to urge the two sealing units apart from each other in opposite axial directions towards the rolling elements 3.

The perforated ring 21, by steadily connecting the two sealing units 9, reduces the risk of one of them being mounted in a wrong position or with an incorrect inclination. Therefore the risk is reduced of pressurized air leaking sideways out of the annular chamber 14 instead of passing through the outlet channels 7 (or 6), compromising the air supply to the tire and reducing the efficiency and the useful life of the bearing.

The axially inner or facing surfaces of the radial walls 10b of the two reinforcements abut against respective opposite axial ends of the perforated ring 21. Thus, it will be appreciated that the ring 21 serves also as a spacer for ensuring that the correct distance is maintained between the two sealing units 9. This reduces the risk of one of the two units being located in an excessively central position, obstructing the channels 6.

In the preferred embodiment shown in the drawings the free ends of the radial walls 10b of the two opposite sealing units 9 are oblique and diverging form one another so as to optimize the available space and create space for the springs 15.

Figure 5:
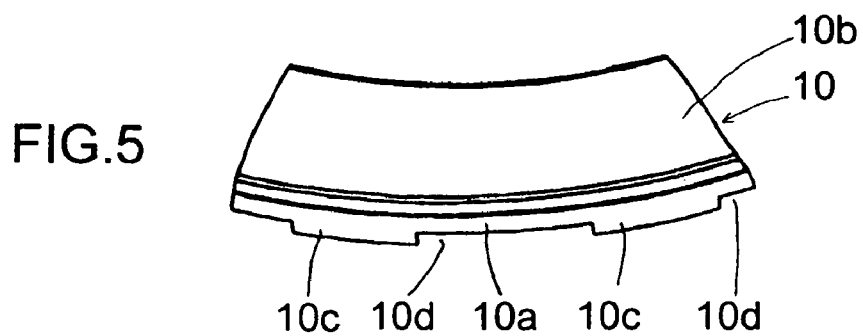
FIG. 5 is a partial perspective view of a detail of the sealing device of the invention.

As shown in FIGS. 4 and 5, in the preferred embodiment the cylindrical walls 10a of the reinforcements 10 form an alternate succession of tabs 10c extending in an axial direction and circumferentially spaced by notches 10d in order to optimize the contact surface between the reinforcements and the cylindrical cavity 1a of the bearing without obstructing the air passage bores 22. The tabs 10c of one reinforcement are axially aligned with the tabs of the other reinforcement. The facing ends of the tabs 10c do not contact each other, in order to leave a certain gap between the two sealing units. This allows air to pass radially through the sealing device also in the event that, owing to a defective assembling, the tabs 10c are radially aligned with the bores 22 of the ring 21 and/or the bearing channels 6.

It is to be understood that the invention is not limited to the embodiment here described and illustrated which is to be considered as an exemplary implementation of the invention. Rather, the invention is likely to undergo modifications as to the shape and location of parts, constructional and functional details. Those skilled in the art will recognize that, with some modifications, the invention can equally be implemented with an annular element of different shape from the cylindrical ring 21 shown in the drawings. For example, an annular element equivalent to the one here designated at 21 may have air passages or recesses shaped or arranged differently from the central bores 22.

What is claimed is:

1. A sealing device for a rolling bearing, the bearing comprising at least one stationary race and at least one rotatable race, each defining respective channels for the passage of pressurized air, the sealing device comprising:
   two flexible gaskets;
   two annular sealing units axially facing one another, each sealing unit comprising an annular reinforcement having an axial cylindrical wall for mounting to a first bearing race and a substantially radial wall extending from the cylindrical wall for reinforcing the respective flexible gaskets,
   a perforated ring having a plurality of radial air passages, the perforated ring coupling the two sealing units;
   wherein the perforated ring is located coaxially and forcefully coupled with radial interference within both of the cylindrical walls of the two reinforcements, and wherein the substantially radial walls of the two reinforcements provide axially inner facing surfaces axially abutting respective opposite axial ends of the perforated ring, and the cylindrical walls of the two reinforcements are at least in part axially spaced from one another by the perforated ring to allow pressurized air to flow through the passages of the perforated ring.

2. A sealing device according to claim 1, wherein the radial passages are located in a radial mid-plane of the perforated ring.

3. A sealing device according to claim 2, wherein the two sealing units are arranged symmetrically with respect to the central mid-plane.

4. A sealing device according to claim 1, wherein the two sealing units are identical.

5. A sealing device according to claim 1, wherein the perforated ring comprises a cylindrical ring and that the radial passages are radial through bores.

6. A sealing device according to claim 1, wherein the radial passages are circumferentially spaced from one another.

7. A sealing device according to claim 1, wherein the radial walls of the two opposite sealing units have oblique free ends diverging from one another.

8. A sealing device according to claim 1, wherein each cylindrical wall forms a set of tabs extending in an axial direction and circumferentially spaced by notches.

9. A sealing device according to claim 8, wherein the passages of the perforated ring are radially aligned with respective notches.

10. A sealing device according to claim 8, wherein the tabs of one reinforcement are axially aligned with the tabs of the other reinforcement.

11. A sealing device according to claim 10, wherein the tabs of one reinforcement have free axial ends axially spaced from free ends of the tabs of the other reinforcement.

12. A rolling bearing assembly for the hub of a motor vehicle wheel comprising a sealing device according to claim 1, the roller bearing assembly comprising a bearing defining a bearing cavity, and with at least one stationary race and at least one rotatable race, each race defining respective channels for the passage of pressurized air, wherein the forced coupling of the perforated ring exert a force directly toward the bearing cavity.

13. A bearing assembly according to claim 12, wherein the radial passages formed by the perforated rings of the two sealing units are circumferentially spaced from one another so as to be radially aligned with the channels formed in the bearing race in which the device is to be fitted.

14. A sealing device according to claim 1, wherein a radial thickness of the perforated ring is approximately equal to a radial thickness of the reinforcements.

\* \* \* \* \*